US008387371B2

(12) United States Patent
Zhang et al.

(10) Patent No.: US 8,387,371 B2
(45) Date of Patent: Mar. 5, 2013

(54) APPARATUS, SYSTEM, AND METHOD FOR DIESEL EXHAUST FLUID HEATING CONTROL

(75) Inventors: Yuetao Zhang, Columbus, IN (US); Mickey McDaniel, Greenwood, IN (US); Baohua Qi, Columbus, IN (US); David Everard, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 245 days.

(21) Appl. No.: 12/870,552

(22) Filed: Aug. 27, 2010

(65) Prior Publication Data
US 2011/0047966 A1 Mar. 3, 2011

Related U.S. Application Data

(60) Provisional application No. 61/237,584, filed on Aug. 27, 2009.

(51) Int. Cl.
 *F01N 3/20* (2006.01)
(52) U.S. Cl. ............................................ 60/295; 60/301
(58) Field of Classification Search ............... 60/295, 60/301, 303
See application file for complete search history.

(56) References Cited

U.S. PATENT DOCUMENTS

| 5,884,475 A | 3/1999 | Hofmann et al. |
| 6,901,748 B2 | 6/2005 | Gomulka |
| 7,156,239 B2 | 1/2007 | Klotz et al. |
| 7,398,771 B2 | 7/2008 | Theorell et al. |
| 2007/0251226 A1* | 11/2007 | Kaneko ........................... 60/317 |
| 2008/0202473 A1 | 8/2008 | Cook et al. |
| 2008/0290184 A1 | 11/2008 | Stritzinger et al. |
| 2009/0084095 A1 | 4/2009 | Dalton |

FOREIGN PATENT DOCUMENTS

| DE | 102008038984 A | 2/2010 |
| EP | 1741887 A1 | 10/2007 |
| EP | 2065578 A1 | 6/2009 |
| JP | 2008180110 A | 8/2008 |
| JP | 2006226282 | 8/2009 |
| WO | WO2009112516 A1 | 9/2009 |

OTHER PUBLICATIONS

GB1014280.0, UK Search Report, Dec. 2, 2010.

* cited by examiner

*Primary Examiner* — Thomas Denion
*Assistant Examiner* — Jonathan Matthias
(74) *Attorney, Agent, or Firm* — Kunzler Law Group, PC

(57) ABSTRACT

According to one embodiment, an apparatus for controlling the heating of diesel exhaust fluid (DEF) in a DEF delivery system includes a temperature comparison module that compares a difference between a sensed ambient air temperature and a sensed DEF tank temperature with a predetermined temperature difference threshold. Additionally, the apparatus includes a DEF heating status module that is configured to generate a DEF heating command according to (i) the sensed ambient air temperature if the difference between the sensed ambient air temperature and sensed DEF tank temperature is less than the predetermined temperature threshold; and (ii) the sensed DEF tank temperature if the difference between the sensed ambient air temperature and sensed DEF tank temperature is more than the predetermined temperature threshold. The apparatus also includes a DEF heating control module that is configured to control the heating of the DEF according to the DEF heating command.

19 Claims, 3 Drawing Sheets

APPARATUS, SYSTEM, AND METHOD FOR DIESEL EXHAUST FLUID HEATING CONTROL

CROSS-REFERENCE TO RELATED APPLICATION

This application claims the benefit of U.S. Provisional Patent Application No. 61/237,584, filed Aug. 27, 2009, which is incorporated herein by reference.

FIELD

This disclosure relates to diesel exhaust fluid delivery systems, and more specifically to controlling the heating of diesel exhaust fluid in diesel exhaust fluid delivery systems.

BACKGROUND

Exhaust after-treatment systems receive and treat exhaust gas generated from an internal combustion engine. Typical exhaust after-treatment systems include various components configured to reduce the level of harmful exhaust emissions present in the exhaust gas. For example, some exhaust after-treatment systems for diesel powered internal combustion engines include various components, such as a diesel oxidation catalyst (DOC), a particulate matter filter or diesel particulate filter (DPF), and an SCR catalyst. In some exhaust after-treatment systems, exhaust gas first passes through the DOC, then passes through the DPF, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides ($NO_x$) present in the exhaust gas.

SCR catalyst systems utilize a diesel exhaust fluid (DEF) or reductant to reduce $NO_x$ in exhaust gas. Typical SCR systems include a DEF delivery system that includes a DEF source, pump, and delivery mechanism. The DEF source can be a container or tank storing a DEF, such as, for example, urea solution or ammonium formate solution. The pump supplies DEF from the source to the delivery mechanism via a DEF line. The delivery mechanism, which typically is a DEF injector, delivers the DEF into an exhaust gas stream upstream of an SCR catalyst. In automotive applications, the DEF typically is urea, which decomposes to produce ammonia. After reduction, the ammonia reacts with $NO_x$ in the presence of the SCR catalyst to reduce $NO_x$ to less harmful emissions, such as $N_2$ and $H_2O$.

For proper operation, the temperature of the DEF stored in the DEF storage tank and pumped through the DEF line between the tank and delivery mechanism must be maintained above the freezing point of the DEF and below a maximum temperature of the DEF. Emissions regulations require SCR systems to provide a temperature control system for heating the DEF when operating at low ambient temperatures. Some conventional DEF temperature control systems use engine coolant to heat DEF stored in the storage tank and line. Other conventional DEF temperature control systems employ electrical heaters instead of coolant to heat DEF in the storage tank and line.

Generally, for proper operation, conventional DEF temperature control systems require an ambient air temperature sensor as the primary input. The ambient air temperature, as detected by an ambient air sensor, is required as a reference point from which a proper heating temperature, i.e., an upper heating limit, is established. Unfortunately, however, ambient air temperature sensors may have various tolerances depending on the sensor mounting location and/or vehicle operating conditions. For example, ambient air temperature sensors may be mounted in different locations for different engine platforms. Also, different engine platforms may use ambient air temperature sensors in different ways to detect ambient air temperature.

Sensor tolerances may affect the accuracy of the ambient air temperature readings. For example, an ambient air temperature sensor may be mounted in a location that tends to cause either positive or negative errors in the ambient air temperature sensor readings. Further, an ambient air temperature sensor may be defective or become inaccurate over time based on limits and mounting locations of the sensor, which may lead to an increased risk of refreezing or overheating the DEF.

SUMMARY

The subject matter of the present application has been developed in response to the present state of the art, and in particular, in response to the problems and needs in the art that have not yet been fully solved by currently available exhaust after-treatment control systems and DEF heating systems. Accordingly, the subject matter of the present application has been developed to provide an apparatus, system, and method that overcomes at least some of the shortcomings of the prior art. For example, in some embodiments described herein, an apparatus, system, and method for DEF heating control includes relying on an ambient temperature sensor for DEF heating control under certain operating conditions and relying on a DEF storage tank temperature sensor for DEF heating control under other operating conditions. In this manner, an apparatus, method, and system for DEF heating control is provided that accounts for inaccurate ambient temperature sensor readings or significant discrepancies between ambient temperature sensor and DEF storage tank temperature sensor readings.

According to one embodiment, an apparatus for controlling the heating of diesel exhaust fluid (DEF) in a DEF delivery system is disclosed herein. The DEF delivery system can be one having a DEF storage container. The apparatus includes a temperature comparison module that is configured to compare a difference between a sensed ambient air temperature and a sensed temperature of DEF contained in the DEF storage container with a predetermined temperature difference threshold. Additionally, the apparatus includes a DEF heating status module that is configured to generate a DEF heating command according to the sensed ambient air temperature if the difference between the sensed ambient air temperature and sensed temperature of DEF is less than the predetermined temperature threshold. In contrast, the DEF heating status module generates the DEF heating command according to the sensed temperature of DEF (e.g., independent of the sensed ambient air temperature) if the difference between the sensed ambient air temperature and sensed temperature of DEF is more than the predetermined temperature threshold. The apparatus also includes a DEF heating control module that is configured to control the heating of the DEF according to the DEF heating command.

In certain implementations of the apparatus, the DEF heating control module communicates a DEF heating event status to the DEF heating status module. The DEF heating command can be based on the DEF heating event status.

According to some implementations of the apparatus, when the DEF heating event status indicates an ongoing DEF heating event is occurring, the DEF heating command can be a DEF heating event stop command. Moreover, generation and communication of the DEF heating event stop command is delayed until at least one of the sensed ambient temperature is above a first predetermined upper temperature threshold and the sensed temperature of DEF contained in the DEF storage container is above a second predetermined upper temperature threshold. The first and second predetermined upper temperature thresholds can be the same. Alternatively, in some implementations, the first and second predetermined upper temperature thresholds can be different.

In certain implementations, when the difference between the sensed ambient air temperature and sensed temperature of DEF is less than the predetermined temperature threshold, the first and second predetermined upper temperature thresholds are defined as a first set of first and second predetermined upper temperature thresholds. When the difference between the ambient air temperature and sensed temperature of DEF is more than the predetermined temperature threshold, the first and second predetermined upper temperature thresholds are defined as a second set of first and second predetermined upper temperature thresholds. The first and second predetermined upper temperature thresholds of the first set are higher than the respective first and second predetermined upper temperature thresholds of the second set.

In certain implementations of the apparatus, when the DEF heating event status indicates an ongoing DEF heating event is not occurring, the DEF heating command can be a DEF heating event start command. Generation of the DEF heating event start command can be delayed until at least one of the sensed ambient temperature falls below a first predetermined lower temperature threshold and the sensed temperature of DEF contained in the DEF storage container falls below a second predetermined lower temperature threshold. The first and second predetermined lower temperature thresholds can be the same in some implementations, and in other implementations, the first and second predetermined lower temperature thresholds can be different.

In some implementations of the apparatus, when the difference between the sensed ambient air temperature and sensed temperature of DEF is less than the predetermined temperature threshold, the first and second predetermined lower temperature thresholds are defined as a first set of first and second predetermined lower temperature thresholds. Moreover, when the difference between the ambient air temperature and sensed temperature of DEF is more than the predetermined temperature threshold, the first and second predetermined lower temperature thresholds are defined as a second set of first and second predetermined lower temperature thresholds. The first and second predetermined lower temperature thresholds of the first set are higher than the respective first and second predetermined lower temperature thresholds of the second set.

According to another embodiment, a DEF heating system includes a DEF heating mechanism that is communicable in heat transfer communication with DEF in a DEF delivery system. In certain implementations, the DEF delivery system includes a DEF storage tank and DEF lines. The system also includes an ambient air temperature sensor configured to sense the temperature of ambient air and a DEF temperature sensor configured to sense the temperature of DEF contained in the DEF storage tank. Further, the system includes a controller that is communicable in electronic communication with the DEF heating mechanism to control the transfer of heat from the DEF heating mechanism to DEF in the DEF delivery system. The controller is operable in a first mode to control the transfer of heat from the DEF heating mechanism to DEF in the DEF delivery system based on a temperature of ambient air as sensed by the ambient air temperature sensor. The controller is additionally operable in a second mode to control the transfer of heat from the DEF heating mechanism to DEF in the DEF delivery system based on a temperature of DEF contained in the DEF storage tank as sensed by the DEF temperature sensor. Operation in the second mode is performed independently of the temperature of ambient air sensed by the ambient air temperature.

In certain implementations of the system, the controller operates in the first mode when the difference between the sensed ambient air temperature and sensed temperature of DEF is less than the predetermined temperature threshold. Additionally, the controller operates in the second mode when the difference between the sensed ambient air temperature and sensed temperature of DEF is more than the predetermined temperature threshold. In some implementations, the transfer of heat from the DEF heating mechanism to DEF in the DEF delivery system is defined as the transfer of heat from the DEF heating mechanism to DEF in the DEF storage tank and DEF lines. Accordingly, in the first mode, the controller controls the transfer of heat from the DEF heating mechanism to (i) DEF in the DEF storage tank based on one of a sensed ambient air temperature and sensed temperature of DEF contained in the DEF storage tank; and (ii) DEF in the DEF lines based on the sensed ambient air temperature independent of the sensed temperature of DEF contained in the DEF storage tank. In the second mode the controller controls the transfer of heat from the DEF heating mechanism to DEF in the DEF lines based on a sensed temperature of DEF contained in the DEF storage tank, independent of the sensed ambient air temperature.

According to some implementations of the system, the transfer of heat from the DEF heating mechanism to DEF in the DEF delivery system includes the transfer of heat from the DEF heating mechanism to DEF in the DEF lines. In such implementations, controlling the transfer of heat according to the first and second modes corresponds only with the transfer of heat from the DEF heating mechanism to DEF in the DEF lines.

In yet further implementations of the system, the controller operates in the first mode when the sensed temperature of ambient air is less than the sensed temperature of DEF contained in the DEF storage tank, and operates in the second mode when the ambient air temperature is experiencing irrational behavior.

In another embodiment, a method for controlling the heating of diesel exhaust fluid (DEF) contained in a DEF delivery system that includes a DEF storage tank and DEF delivery lines is disclosed herein. The method includes sensing a temperature of ambient air and sensing a temperature of DEF contained in the DEF storage container. Further, the method includes determining a temperature difference between the sensed temperature of ambient air and sensed temperature of DEF contained in the DEF storage container. The method also includes comparing the temperature difference with a predetermined threshold. Additionally, the method includes heating DEF in the DEF delivery system based on the sensed temperature of ambient air if the temperature difference is below the predetermined threshold. Alternatively, the method includes heating DEF in the DEF delivery system based on the sensed temperature of DEF contained in the DEF storage container if the temperature difference is above the predetermined threshold.

According to some implementations of the method, if the temperature difference is below the predetermined threshold, the method includes determining if a DEF heating event is occurring, determining if the sensed temperature of ambient air is greater than a predetermined upper temperature threshold, and stopping the DEF heating event if a DEF heating event is occurring and the sensed temperature of ambient air is greater than the predetermined upper temperature threshold. The method may also include allowing the DEF heating event to continue if a DEF heating event is occurring and the sensed temperature of ambient air is lower than the predetermined upper temperature threshold.

In yet some implementations of the method, if the temperature difference is below the predetermined threshold, the method includes determining if a DEF heating event is occurring, determining if the sensed temperature of ambient air is less than a predetermined lower temperature threshold, and starting a DEF heating event if a DEF heating event is not occurring and the sensed temperature of ambient air is less than the predetermined lower temperature threshold. The method may also include delaying the start of a DEF heating event if a DEF heating event is not occurring and the sensed temperature of ambient air is greater than the predetermined lower temperature threshold.

According to certain implementations, if the temperature difference is above the predetermined threshold, the method includes determining if a DEF heating event is occurring, determining if the sensed temperature of DEF contained in the DEF storage container is greater than a predetermined upper temperature threshold, and stopping the DEF heating event if a DEF heating event is occurring and the sensed temperature of DEF contained in the DEF storage container is greater than the predetermined upper temperature threshold. The method may also include allowing the DEF heating event to continue if a DEF heating event is occurring and the sensed temperature of DEF contained in the DEF storage container is lower than the predetermined upper temperature threshold.

In yet certain implementations, if the temperature difference is above the predetermined threshold, the method includes determining if a DEF heating event is occurring, determining if the sensed temperature of DEF contained in the DEF storage container is less than a predetermined lower temperature threshold, and starting a DEF heating event if a DEF heating event is not occurring and the sensed temperature of DEF contained in the DEF storage container is less than the predetermined lower temperature threshold. The method may also include delaying the start of a DEF heating event if a DEF heating event is not occurring and the sensed temperature of DEF contained in the DEF storage container is greater than the predetermined lower temperature threshold.

Reference throughout this specification to features, advantages, or similar language does not imply that all of the features and advantages that may be realized with the present disclosure should be or are in any single embodiment or implementation of the disclosure. Rather, language referring to the features and advantages is understood to mean that a specific feature, advantage, or characteristic described in connection with an embodiment is included in at least one embodiment of the present disclosure. Discussion of the features and advantages, and similar language, throughout this specification may, but do not necessarily, refer to the same embodiment or implementation.

The described features, advantages, and characteristics of the present disclosure may be combined in any suitable manner in one or more embodiments and/or implementations. One skilled in the relevant art will recognize that the subject matter of the present disclosure may be practiced without one or more of the specific features or advantages of a particular embodiment or implementation. In other instances, additional features and advantages may be recognized in certain embodiments and/or implementations that may not be present in all embodiments or implementations. These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, or characteristics of the subject matter described herein may be combined in any suitable manner in one or more embodiments. In the following description, numerous specific details are provided to impart a thorough understanding of embodiments of the disclosure. One skilled in the relevant art will recognize, however, that the subject matter of the present disclosure may be practiced without one or more of the specific details, or with other methods, components, materials, and so forth. In other instances, well-known structures, materials, or operations are not shown or described in detail to avoid obscuring aspects of the disclosure.

Figure 1:
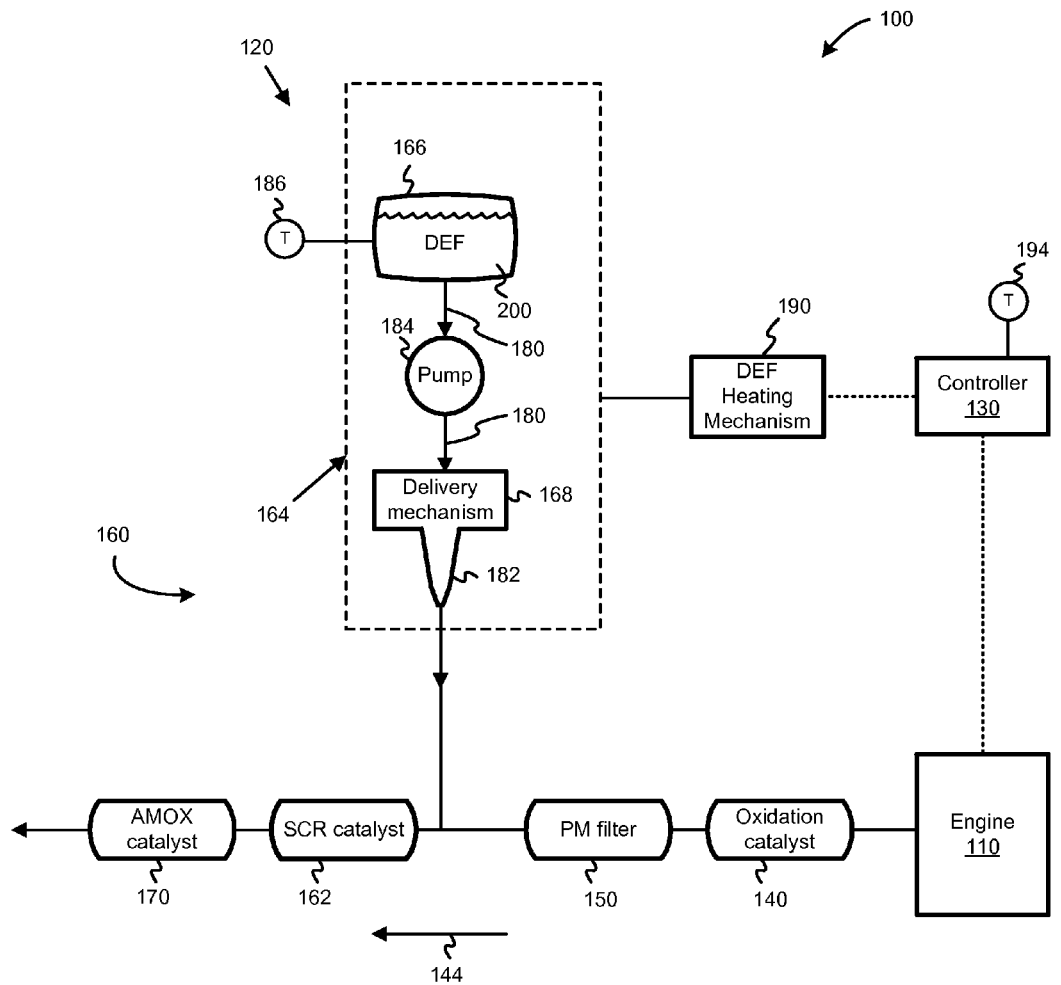
FIG. 1 is a schematic block diagram of an internal combustion engine system having an engine, an exhaust aftertreatment system, a controller, and a DEF heating mechanism according to one representative embodiment.

FIG. 1 depicts one embodiment of an internal combustion engine system 100. The main components of the engine system 100 include an internal combustion engine 110, an exhaust gas after-treatment system 120 coupled to the engine, and a controller 130 in electronic communication with the engine 110 and after-treatment system 120.

The internal combustion engine 110 can be a compression ignited internal combustion engine, such as a diesel fueled engine, or a spark-ignited internal combustion engine, such as a gasoline fueled engine operated lean. Within the internal combustion engine 110, air from the atmosphere is combined with fuel to power the engine. Combustion of the fuel and air produces exhaust gas that is operatively vented to an exhaust manifold. From the exhaust manifold, at least a portion of the generated exhaust gas flows into the exhaust gas after-treatment system 120 in a direction indicated by directional arrow 144.

Generally, the exhaust gas after-treatment system 120 is configured to remove various chemical compounds and particulate emissions present in the exhaust gas generated by the engine 110. As exemplary of one particular embodiment, the exhaust gas after-treatment system 120 includes an oxidation catalyst 140, a particulate matter (PM) filter 150, an SCR system 160, and an ammonia oxidation (AMOX) catalyst 170. In the exhaust flow direction, indicated by directional arrow 144, exhaust may flow from the engine 110, through the oxidation catalyst 140, through the particulate filter 150, through an SCR catalyst 162 of the SCR system 160, through the AMOX catalyst 170, and then be expelled into the atmosphere via a tailpipe. In other words, the particulate filter 150 is positioned downstream of the oxidation catalyst 140, the SCR catalyst 162 is positioned downstream of the particulate filter 150, and the AMOX catalyst 170 is positioned downstream of the SCR catalyst 162.

Exhaust gas treated in the exhaust gas after-treatment system 120 and released into the atmosphere consequently contains significantly fewer pollutants, such as diesel particulate matter, $NO_x$, hydrocarbons, and carbon monoxide, than untreated exhaust gas. Although the exhaust after-treatment system 120 shown includes one of an oxidation catalyst 140, particulate filter 150, SCR catalyst 162, and AMOX catalyst 170 positioned in specific locations relative to each other along the exhaust flow path, in other embodiments, the exhaust after-treatment system may include more than one of any of the various catalysts positioned in any of various positions relative to each other along the exhaust flow path as desired. Further, although the oxidation catalyst 140 and AMOX catalyst 170 are non-selective catalysts, in some embodiments, the oxidation and AMOX catalysts can be selective catalysts.

The SCR system 160 includes a DEF delivery system 164 that includes a DEF tank 166 storing DEF 200, DEF pump 184, and DEF delivery mechanism 168. The DEF tank 166 is capable of retaining the DEF 200, which can be, for example, a urea solution or ammonium formate solution. The DEF tank 166 is in DEF supplying communication with the pump 184, which is configured to pump DEF from the DEF tank 166 to the delivery mechanism 168 via DEF lines 180. Alternatively, the pump 184 can be a push-type pump upstream of the DEF tank 166. The DEF lines 180 can be any of various reductant lines commonly used in the art. In some implementations, the reductant lines 180 are elongate lengths of hydraulic tubing having any of various diameters, e.g., between about 6 mm and about 8 mm.

The DEF delivery mechanism 168 can include a DEF injector 182 configured to inject DEF into the exhaust gas stream upstream of the SCR catalyst 162. The injector 182 is selectively controllable to inject DEF directly into the exhaust gas stream prior to the exhaust gas entering the SCR catalyst 162. As discussed above, the DEF can be a urea solution, which decomposes to produce ammonia. The ammonia reacts with $NO_x$ in the presence of the SCR catalyst 162 to reduce the $NO_x$ to less harmful emissions, such as $N_2$ and $H_2O$. The SCR catalyst 162 can be any of various catalysts known in the art. For example, in some implementations, the SCR catalyst 162 is a vanadium-based catalyst, and in other implementations, the SCR catalyst is a zeolite-based catalyst, such as a Cu-Zeolite or a Fe-Zeolite catalyst. In one representative embodiment, the DEF is aqueous urea and the SCR catalyst 162 is a zeolite-based catalyst.

In an automotive application where the engine 110 and exhaust gas after-treatment system 120 form part of a vehicle, the engine and exhaust gas after-treatment system can be exposed to harsh environmental conditions. Notwithstanding the potentially negative effects external conditions may have on the performance of an exhaust after-treatment system 120, the exhaust gas after-treatment system is expected to reduce harmful exhaust emissions in compliance with regulatory standards regardless of the external conditions. In extreme cold conditions, the DEF is prone to freezing, which would prevent DEF from being injected into the exhaust gas stream and $NO_x$ reduction on the SCR catalyst 162. Accordingly, the DEF contained by the source 166 must be heated to prevent freezing, which for a 32.5% wt urea solution (e.g., AdBlue urea solution manufactured by WEMA of Laksevaag, Norway) is about −11° C. Additionally, the DEF 200 flowing within the DEF lines 180 from the tank 166 to the delivery mechanism 168 also must be heated to prevent freezing. However, the DEF 200 should not be heated too much, as high temperatures may result in a breakdown of the chemical properties of the DEF and/or damage to the components of the DEF delivery system 164, e.g., the DEF lines 180.

To unfreeze or prevent freezing of the DEF 200 in the DEF delivery system 164, the internal combustion engine system 100 includes a DEF heating mechanism 190. The DEF heating mechanism 190 is configured to heat the DEF 200 in the tank 166 and DEF lines 180 to unfreeze the DEF should it be frozen prior to a start-up of the engine 110 and maintain the DEF in an unfrozen or thawed state during operation of the engine. In some embodiments, the DEF heating mechanism 190 is an engine coolant based heating mechanism, an electric heater based mechanism, or combination of both. In one embodiment, the DEF heating mechanism 190 includes a coolant based heating mechanism to heat DEF in the tank 166 and an electric heater based mechanism to heat DEF in the lines 180. The DEF heating system 190 also includes a DEF tank temperature sensor 186 and an ambient air temperature sensor 194. The DEF tank temperature sensor 186 is configured to sense the temperature of the DEF stored in the DEF tank 166 and the ambient air temperature sensor 194 is configured to sense the temperature of ambient air. The DEF tank and ambient air temperature sensors 186, 194 are in electrical communication with the controller 130.

Generally, the controller 130 controls operation of the DEF heating mechanism 190. DEF heating controls include commands directed to the DEF heating mechanism 190 to initiate a DEF heating event, stop an ongoing DEF heating event, and regulate the magnitude of heat supplied to the DEF during a DEF heating event. According to some implementations, the magnitude of heat supplied to the DEF is varied by modulating a pulse-width modulated (PWM) signal where the duty cycle of the PWM signal is directly proportional to the level of heat supplied to the DEF. The DEF heating control commands are based on either the ambient air temperature as sensed by the ambient air temperature sensor 194 (e.g., independently of the temperature of the DEF in the DEF tank), the temperature of DEF 200 in the tank 166 as sensed by the DEF tank temperature sensor 186 (e.g., independently of the temperature of the ambient air), or both. Generally, as defined herein, and unless otherwise noted, when the DEF heating control commands are "based on" or generated "according to" one of the ambient air and DEF tank temperatures, such commands are determined or generated independently of the other of the ambient air and DEF tank temperatures.

In certain embodiments, when the temperature sensors 186, 194 are providing accurate readings, DEF heating control commands for controlling the heating of DEF 200 in the tank 166 are based on the DEF tank temperature as sensed by DEF tank temperature sensor 186, and DEF heating control commands for controlling the heating of DEF 200 in the lines 180 are based on the ambient air temperature as sensed by the ambient air temperature sensor 194. Accordingly, the controller 130 controls heating events on the DEF tank 266 based on DEF tank temperature readings and heating events on the DEF lines 180 based on the ambient air temperature readings unless the ambient air temperature sensor 194 is experiencing irrational behavior. If the ambient air temperature sensor 194 is experiencing irrational behavior, then the controller 130 controls heating events on both the DEF tank 166 and DEF lines 180 based on the DEF temperature readings from the DEF tank temperature sensor 186, and the ambient air temperature readings from the ambient air temperature sensor are not used.

In other embodiments, the controller 130 controls heating events on both the DEF tank 266 and DEF lines 180 based on the ambient air temperature readings from the ambient air temperature sensor 194 unless the ambient air temperature sensor is experiencing irrational behavior. In such embodiments, the controller 130 still controls heating events on both the DEF tank 166 and DEF lines 180 based on the DEF temperature readings from the DEF tank temperature sensor 186 when the ambient air temperature sensor is experiencing irrational behavior.

Figure 2:
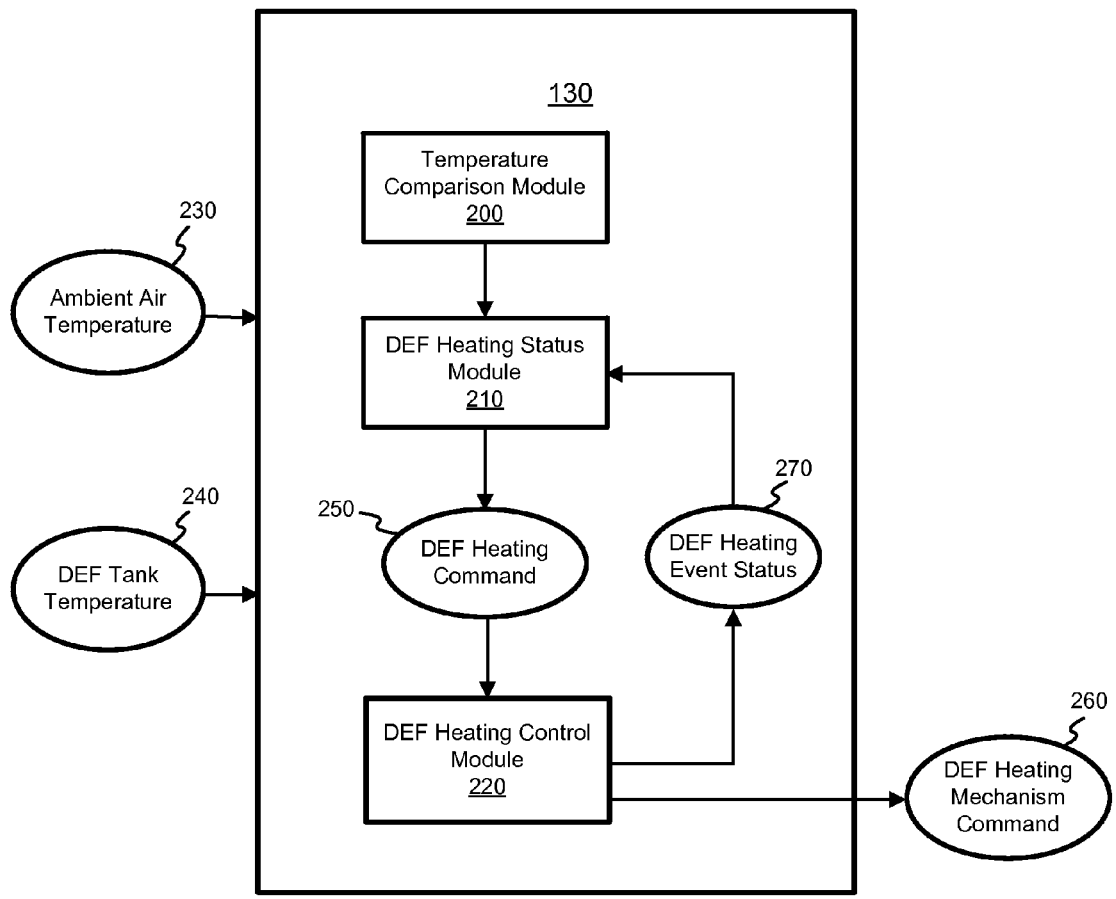
FIG. 2 is a schematic block diagram of a controller of an internal combustion engine system according to one representative embodiment.

Referring to FIG. 2, the controller 130 includes a temperature comparison module 200, DEF heating status module 210, and DEF mechanism control module 220. The temperature comparison module 200 receives as input an ambient air temperature 230 as sensed by the ambient air temperature sensor 194 and a DEF tank temperature 240 as sensed by the DEF tank temperature sensor 186. The temperature comparison module 200 is configured to determine a difference between the ambient air temperature 230 and DEF tank temperature 240. The determined difference is compared to a predetermined temperature difference threshold and the results of the comparison are communicated to the DEF heating status module 210.

Generally, in normal operating conditions, the temperature of DEF in the tank 166 and the actual temperature of ambient air should be substantially the same. Therefore, a substantial difference between the detected ambient air temperature 230 and DEF tank temperature 240 may indicate either a problem with the ambient temperature sensor 194 or an abnormal operating condition. For example, an ambient air temperature 230 that reads substantially higher than a DEF tank temperature 240 may indicate the ambient air temperature sensor 194 is either malfunctioning or being abnormally heated by the engine 110. Therefore, the predetermined temperature difference threshold represents the temperature difference at which the ambient air temperature 230 has become irrational or unreliable. The larger the difference between the ambient air temperature 230 and DEF tank temperature 240, the more irrational the detected ambient air temperature. Accordingly, in certain implementations, the predetermined temperature difference threshold represents the maximum temperature difference at which the ambient air temperature 230 is still considered rational and reliable. As discussed above, irrationality of the ambient air temperature 230 can occur due to certain tolerances or limitations of the ambient air temperature sensor 194.

The DEF heating status module 210 is configured to generate a DEF heating command 250 and communicate the DEF heating command to the DEF mechanism control module 220. The DEF heating command 250 instructs the DEF heating control module 220 to either stop a DEF heating event, start a DEF heating event, or modify an ongoing DEF heating event. As defined herein, the DEF heating event can be a heating event on the DEF tank 166, DEF lines 180, or both. In some preferred embodiments, the DEF heating event is a heating event on the DEF lines 180 and control of the DEF heating event on the lines is independent of the control of DEF heating of the DEF tank 166. In such embodiments, the DEF heating command 250 instructs the DEF heating control module 220 to either stop or start a DEF heating event on the DEF lines 180.

The DEF heating command 250 is generated based on the difference between the ambient air temperature 230 and DEF tank temperature 240. More specifically, the DEF heating status module 210 generates the DEF heating command 250 based on whether the difference between the ambient air temperature 230 and DEF tank temperature 240 is above the predetermined threshold. Generally, in certain embodiments, if the difference is below the predetermined threshold, the ambient air temperature 230 is deemed accurate and the DEF heating command 250 is based on the ambient air temperature 230. However, if the difference is above the threshold, the ambient air temperature 230 is deemed inaccurate and the DEF heating command 250 is based on the DEF tank temperature 240.

The DEF heating command 250 also is based on whether a DEF heating event is occurring. As shown in FIG. 2, the DEF heating status module 210 receives a DEF heating event status 270 from the DEF heating control module 220. The DEF heating event status 270 identifies whether a DEF heating event is ongoing. If the DEF heating event status 270 indicates a DEF heating event is ongoing, then the DEF heating command 250 is generated to instruct the DEF heating control module 220 to stop or modify the DEF heating event. If, however, the DEF heating event status 270 indicates a DEF heating event is not occurring, then the DEF heating command 250 is generated to instruct the DEF heating control module 220 to initiate a DEF heating event.

The DEF heating command 250 is not generated and communicated to the DEF heating control module 220 unless certain conditions are met. For example, when a DEF heating event is occurring, the DEF heating command 250 to stop the heating event is not generated and communicated to the DEF heating control module 220 until a respective one of the ambient air temperature 230 and DEF tank temperature 240 is greater than a respective predetermined upper temperature threshold. Likewise, when a DEF heating event is not occurring, the DEF heating command 250 to start a heating event is not generated and communicated to the DEF heating control module 220 until a respective one of the ambient air temperature 230 and DEF tank temperature 240 is less than a respective predetermined lower temperature threshold. Accordingly, in certain implementations, the DEF heating status module continuously receives ambient air and DEF tank temperature inputs 230, 240 from the respective temperature sensors 194, 186.

The predetermined upper temperature thresholds for DEF heating control based on the ambient air and DEF tank temperatures 230, 240, respectively, each represent a desirable maximum temperature of the DEF stored in the tank 166. The desirable maximum temperature can be associated with the temperature above which the components of the DEF delivery system 164 and DEF heating mechanism 190 may begin to fail or breakdown of the DEF itself may begin to occur. In some embodiments, the predetermined upper temperature thresholds associated with the ambient air and DEF tank temperatures 230, 240, respectively, are substantially the same. In other embodiments, the predetermined upper temperature thresholds associated with the ambient air and DEF tank temperatures 230, 240, respectively, are different. Additionally, based on the application for which the engine is being used, the upper temperature thresholds associated with DEF heating control based on ambient air temperature 230 can be higher than the upper temperature thresholds associated with DEF heating control based on DEF tank temperature 240.

The predetermined lower temperature thresholds for DEF heating control based on the ambient air and DEF tank temperatures 230, 240, respectively, each represent a desirable minimum temperature of the DEF stored in the tank 166. The desirable minimum temperature can be associated with the temperature below which the DEF 200 stored in the tank 166 and lines 180 freezes. In some implementations, the desirable minimum temperature is at least a few degrees above the freezing temperature of the DEF 200 to ensure fluidity of the DEF. In some embodiments, the predetermined lower temperature thresholds associated with the ambient air and DEF tank temperatures 230, 240, respectively, are substantially the same. In other embodiments, the predetermined lower temperature thresholds associated with the ambient air and DEF tank temperatures 230, 240, respectively, are different. Additionally, based on the application for which the engine is being used, the lower temperature threshold associated with DEF heating control based on ambient air temperature 230 can be higher than the lower temperature threshold associated with DEF heating control based on DEF tank temperature 240.

The DEF heating control module 220 is configured to initiate, stop, and regulate DEF heating events. In response to the DEF heating command 250, the DEF heating control module 220 generates a DEF heating mechanism command 260 and communicates the DEF heating mechanism command to the DEF heating mechanism 190. The DEF heating mechanism command 260 instructs the DEF heating mechanism 190 to either stop a DEF heating event, start a DEF heating event, or adjust an ongoing DEF heating event. When the DEF heating command 250 requests a DEF heating event, the DEF mechanism control module 200 signals, via the DEF heating mechanism command 260, an actuating device of the DEF heating mechanism 190 (e.g., an electrical heater or a coolant flow regulating valve) to actuate to facilitate transfer of heat to the DEF in the tank 166 or lines 180. When heating of the DEF should stop, the DEF mechanism control module 200 likewise signals the actuating device to actuate in an opposite manner such that heat transfer to the DEF ceases. During heating of the DEF, should more or less heat transfer be desirable, the DEF mechanism control module 200 signals the actuating device accordingly.

Figure 3:
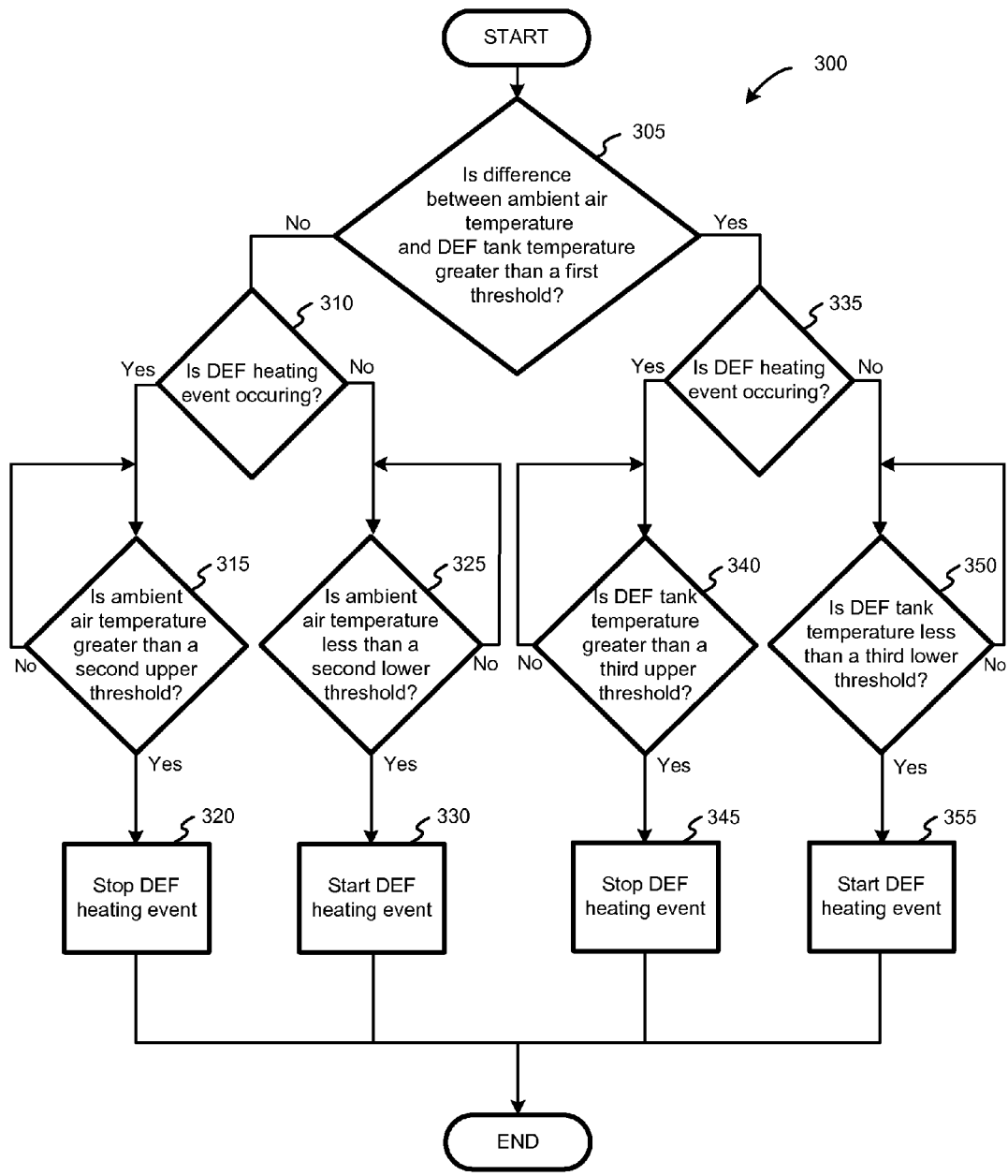
FIG. 3 is a flow chart diagram of a method for controlling the heating of a DEF in a DEF delivery system according to one representative embodiment.

FIG. 3 illustrates a method 300 for controlling the heating of a DEF in a DEF delivery system according to one representative embodiment. The method 300 substantially includes the actions to carry out the functions presented above with respect to the operation of the engine system 100 of FIG. 1. The method 300 starts at 305 by determining if the difference between a sensed ambient air temperature and sensed DEF tank temperature is greater than a first threshold. If the difference is less than the first threshold, then the method proceeds to control the heating of the DEF in a first mode according to the sensed ambient air temperature (i.e., actions 310-330). However, if the difference is more than the first threshold, then the method proceeds to control the heating of the DEF in a second mode according to the sensed DEF tank temperature (i.e., actions 335-355).

Generally, the difference between the ambient air temperature and the DEF tank temperature is below the threshold when the engine system 100 is in a stable environment and the ambient air temperature is operating normally. The method 300 also accounts for changes in environment, such as when a vehicle in which an engine system 100 is housed moves from a warm garage-type environment to a cold outdoor-type environment. In this situation, the ambient air temperature may be significantly lower than the DEF tank temperature because the latent energy or heat mass in the DEF tank may maintain the DEF tank temperature higher than the ambient air temperature for an extended period of time. If the DEF heating control was based solely on the DEF tank temperature, DEF heating events would not occur and the cold temperatures of the cold environment might freeze the DEF lines and damage the DEF delivery system. Accordingly, the method 300 is configured to control the heating of the DEF in the first mode according to the sensed ambient air temperature to prevent freezing of the DEF lines when the DEF tank temperature reads higher than the ambient air temperature.

When the difference between the sensed ambient air and DEF tank temperature is less than the first threshold (e.g., when the ambient air temperature and DEF tank temperature are about the same or the DEF tank temperature is higher than the ambient air temperature), the method 300 proceeds to determine at 310 whether a DEF heating event is occurring. If a DEF heating event is already occurring, then the method 300 determines whether the sensed ambient air temperature is greater than a second upper threshold at 315. When the sensed ambient air temperature is less than the second upper threshold, then the method 300 continuously checks the sensed ambient air temperature and repeats the determination at 315. The determination at 315 is repeated until the sensed ambient air temperature is greater than the second upper threshold, at which time the method 300 proceeds to stop the DEF heating event at 320 and the method 300 ends. If, at 310, a DEF heating event is not occurring, then the method 300 proceeds to determine if the sensed ambient air temperature is less than a second lower threshold at 325. When the sensed ambient air temperature is above the second lower threshold, then the method 300 continuously checks the sensed ambient air temperature and repeats the determination at 325. The determination at 325 is repeated until the sensed ambient air temperature is less than the second lower threshold, at which time the method 300 proceeds to start a DEF heating event at 330 and the method 300 ends.

When, at 305, the difference between the sensed ambient air and DEF tank temperature is greater than the first threshold, the method 300 proceeds to determine at 335 whether a DEF heating event is occurring. If a DEF heating event is already occurring, then the method 300 determines whether the sensed DEF tank temperature is greater than a third upper threshold at 340. When the sensed DEF tank temperature is less than the third upper threshold, then the method 300 continuously checks the sensed DEF temperature and repeats the determination at 340. The determination at 340 is repeated until the sensed DEF tank temperature is greater than the third upper threshold, at which time the method 300 proceeds to stop the DEF heating event at 345 and the method 300 ends.

If, at 335, a DEF heating event is not occurring, then the method 300 proceeds to determine if the sensed DEF tank temperature is less than a third lower threshold at 350. When the sensed DEF tank temperature is above the third lower threshold, then the method 300 continuously checks the sensed DEF tank temperature and repeats the determination at 350. The determination at 350 is repeated until the sensed DEF tank temperature is less than the third lower threshold, at which time the method 300 proceeds to start a DEF heating event at 355 and the method 300 ends.

In some embodiments, the second and third upper thresholds are the same, and in other embodiments, the second and third upper thresholds are different. Similarly, in some embodiments, the second and third lower thresholds are the same, and in other embodiments, the second and third lower thresholds are different.

Although the above embodiments have been described in the context of an internal combustion diesel engine system and diesel exhaust fluid heating, the subject matter of the present disclosure is not limited to such configurations. For example, in other embodiments, the apparatus, systems, and methods described herein can be applied to any of various engine systems or other systems where heating of a material may be desired without departing from the essence of the disclosure.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling the heating of diesel exhaust fluid (DEF) in a DEF delivery system having a DEF storage container, comprising:
   a temperature comparison module configured to compare a difference between a sensed ambient air temperature and a sensed temperature of DEF contained in the DEF storage container with a predetermined temperature difference threshold;
   a DEF heating status module configured to generate a DEF heating command according to the sensed ambient air temperature if the difference between the sensed ambient air temperature and sensed temperature of DEF is less than the predetermined temperature threshold, and to control the heating of the DEF according to the sensed temperature of DEF if the difference between the sensed ambient air temperature and sensed temperature of DEF is more than the predetermined temperature threshold; and
   a DEF heating control module configured to control the heating of the DEF according to the DEF heating command.

2. The apparatus of claim 1, wherein the DEF heating control module communicates a DEF heating event status to the DEF heating status module, and wherein the DEF heating command is based on the DEF heating event status.

3. The apparatus of claim 2, wherein when the DEF heating event status indicates an ongoing DEF heating event is occurring, the DEF heating command comprises a DEF heating event stop command, and wherein generation of the DEF heating event stop command is delayed until at least one of the sensed ambient temperature is above a first predetermined upper temperature threshold and the sensed temperature of DEF contained in the DEF storage container is above a second predetermined upper temperature threshold.

4. The apparatus of claim 3, wherein the first and second predetermined upper temperature thresholds are the same.

5. The apparatus of claim 3, wherein the first and second predetermined upper temperature thresholds are different.

6. The apparatus of claim 3, wherein when the difference between the sensed ambient air temperature and sensed temperature of DEF is less than the predetermined temperature threshold, the first and second predetermined upper temperature thresholds comprise a first set of first and second predetermined upper temperature thresholds, and when the difference between the ambient air temperature and sensed temperature of DEF is more than the predetermined temperature threshold, the first and second predetermined upper temperature thresholds comprise a second set of first and second predetermined upper temperature thresholds, wherein the first and second predetermined upper temperature thresholds of the first set are higher than the respective first and second predetermined upper temperature thresholds of the second set.

7. The apparatus of claim 3, wherein when the difference between the sensed ambient air temperature and sensed temperature of DEF is less than the predetermined temperature threshold, the first and second predetermined lower temperature thresholds comprise a first set of first and second predetermined lower temperature thresholds, and when the difference between the ambient air temperature and sensed temperature of DEF is more than the predetermined temperature threshold, the first and second predetermined lower temperature thresholds comprise a second set of first and second predetermined lower temperature thresholds, wherein the first and second predetermined lower temperature thresholds of the first set are higher than the respective first and second predetermined lower temperature thresholds of the second set.

8. The apparatus of claim 2, wherein when the DEF heating event status indicates an ongoing DEF heating event is not occurring, the DEF heating command comprises a DEF heating event start command, and wherein generation of the DEF heating event start command is delayed until at least one of the sensed ambient temperature falls below a first predetermined lower temperature threshold and the sensed temperature of DEF contained in the DEF storage container falls below a second predetermined lower temperature threshold.

9. The apparatus of claim 8, wherein the first and second predetermined lower temperature thresholds are the same.

10. The apparatus of claim 8, wherein the first and second predetermined lower temperature thresholds are different.

11. A diesel exhaust fluid (DEF) heating system, comprising:
    a DEF heating mechanism communicable in heat transfer communication with DEF in a DEF delivery system comprising a DEF storage tank and DEF lines;
    an ambient air temperature sensor configured to sense the temperature of ambient air;
    a DEF temperature sensor configured to sense the temperature of DEF contained in the DEF storage tank; and
    a controller communicable in electronic communication with the DEF heating mechanism to control the transfer of heat from the DEF heating mechanism to DEF in the DEF delivery system, the controller being operable in a first mode to control the transfer of heat from the DEF heating mechanism to DEF in the DEF delivery system based on a temperature of ambient air sensed by the ambient air temperature sensor, and a second mode to control the transfer of heat from the DEF heating mechanism to DEF in the DEF delivery system based on a temperature of DEF contained in the DEF storage tank sensed by the DEF temperature sensor and independently of the temperature of ambient air sensed by the ambient air temperature;
    wherein the controller operates in the first mode when the difference between the sensed ambient air temperature and sensed temperature of DEF is less than the predetermined temperature threshold, and operates in the second mode when the difference between the sensed ambient air temperature and sensed temperature of DEF is more than the predetermined temperature threshold.

12. The system of claim 11, wherein the transfer of heat from the DEF heating mechanism to DEF in the DEF delivery system comprises the transfer of heat from the DEF heating mechanism to DEF in the DEF storage tank and DEF lines, wherein in the first mode the controller controls the transfer of heat from the DEF heating mechanism to DEF in the DEF storage tank based on one of a sensed ambient air temperature and sensed temperature of DEF contained in the DEF storage tank and to DEF in the DEF lines based on the sensed ambient air temperature independent of the sensed temperature of DEF contained in the DEF storage tank, and wherein in the second mode the controller controls the transfer of heat from the DEF heating mechanism to DEF in the DEF lines based on a sensed temperature of DEF contained in the DEF storage tank independent of the sensed ambient air temperature.

13. The system of claim 11, wherein the transfer of heat from the DEF heating mechanism to DEF in the DEF delivery system comprises the transfer of heat from the DEF heating mechanism to DEF in the DEF lines, and wherein controlling the transfer of heat according to the first and second modes corresponds only with the transfer of heat from the DEF heating mechanism to DEF in the DEF lines.

14. A diesel exhaust fluid (DEF) heating system, comprising:
    a DEF heating mechanism communicable in heat transfer communication with DEF in a DEF delivery system comprising a DEF storage tank and DEF lines;
    an ambient air temperature sensor configured to sense the temperature of ambient air;
    a DEF temperature sensor configured to sense the temperature of DEF contained in the DEF storage tank; and
    a controller communicable in electronic communication with the DEF heating mechanism to control the transfer of heat from the DEF heating mechanism to DEF in the DEF delivery system, the controller being operable in a first mode to control the transfer of heat from the DEF heating mechanism to DEF in the DEF delivery system based on a temperature of ambient air sensed by the ambient air temperature sensor, and a second mode to control the transfer of heat from the DEF heating mechanism to DEF in the DEF delivery system based on a temperature of DEF contained in the DEF storage tank sensed by the DEF temperature sensor and independently of the temperature of ambient air sensed by the ambient air temperature;
    wherein the controller operates in the first mode when the sensed temperature of ambient air is less than the sensed temperature of DEF contained in the DEF storage tank, and operates in the second mode when the ambient air temperature is experiencing irrational behavior.

15. A method for controlling the heating of diesel exhaust fluid (DEF) contained in a DEF delivery system comprising a DEF storage tank and DEF delivery lines, the method comprising:
    sensing a temperature of ambient air;
    sensing a temperature of DEF contained in the DEF storage container;
    determining a temperature difference between the sensed temperature of ambient air and sensed temperature of DEF contained in the DEF storage container;
    comparing the temperature difference with a predetermined threshold;
    heating DEF in the DEF delivery system based on the sensed temperature of ambient air if the temperature difference is below the predetermined threshold; and
    heating DEF in the DEF delivery system based on the sensed temperature of DEF contained in the DEF storage container if the temperature difference is above the predetermined threshold.

16. The method of claim 15, wherein if the temperature difference is below the predetermined threshold, the method further comprises:
    determining if a DEF heating event is occurring;
    determining if the sensed temperature of ambient air is greater than a predetermined upper temperature threshold;
    stopping the DEF heating event if a DEF heating event is occurring and the sensed temperature of ambient air is greater than the predetermined upper temperature threshold; and allowing the DEF heating event to continue if a DEF heating event is occurring and the sensed temperature of ambient air is lower than the predetermined upper temperature threshold.

17. The method of claim 15, wherein if the temperature difference is below the predetermined threshold, the method further comprises:
  determining if a DEF heating event is occurring;
  determining if the sensed temperature of ambient air is less than a predetermined lower temperature threshold;
  starting a DEF heating event if a DEF heating event is not occurring and the sensed temperature of ambient air is less than the predetermined lower temperature threshold; and
  delaying the start of a DEF heating event if a DEF heating event is not occurring and the sensed temperature of ambient air is greater than the predetermined lower temperature threshold.

18. The method of claim 15, wherein if the temperature difference is above the predetermined threshold, the method further comprises:
  determining if a DEF heating event is occurring;
  determining if the sensed temperature of DEF contained in the DEF storage container is greater than a predetermined upper temperature threshold;
  stopping the DEF heating event if a DEF heating event is occurring and the sensed temperature of DEF contained in the DEF storage container is greater than the predetermined upper temperature threshold; and
  allowing the DEF heating event to continue if a DEF heating event is occurring and the sensed temperature of DEF contained in the DEF storage container is lower than the predetermined upper temperature threshold.

19. The method of claim 15, wherein if the temperature difference is above the predetermined threshold, the method further comprises:
  determining if a DEF heating event is occurring;
  determining if the sensed temperature of DEF contained in the DEF storage container is less than a predetermined lower temperature threshold;
  starting a DEF heating event if a DEF heating event is not occurring and the sensed temperature of DEF contained in the DEF storage container is less than the predetermined lower temperature threshold; and
  delaying the start of a DEF heating event if a DEF heating event is not occurring and the sensed temperature of DEF contained in the DEF storage container is greater than the predetermined lower temperature threshold.

* * * * *